US012565604B2

(12) United States Patent
Adams

(10) Patent No.: US 12,565,604 B2

(45) Date of Patent: Mar. 3, 2026

(54) TACK REDUCTION FOR SILICONE GEL SEALS

(71) Applicant: COMMSCOPE TECHNOLOGIES LLC, Hickory, NC (US)

(72) Inventor: Gary William Adams, Holly Springs, NC (US)

(73) Assignee: Commscope Technologies LLC, Hickory, NC (US)

( * ) Notice: Subject to any disclaimer, the term of this patent is extended or adjusted under 35 U.S.C. 154(b) by 839 days.

(21) Appl. No.: 17/432,729

(22) PCT Filed: Feb. 21, 2020

(86) PCT No.: PCT/US2020/019330

§ 371 (c)(1),
(2) Date: Aug. 20, 2021

(87) PCT Pub. No.: WO2020/172606

PCT Pub. Date: Aug. 27, 2020

(65) Prior Publication Data

US 2022/0135852 A1 May 5, 2022

Related U.S. Application Data

(60) Provisional application No. 62/809,055, filed on Feb. 22, 2019.

(51) Int. Cl.
*C09J 11/08* (2006.01)
*C09J 5/00* (2006.01)
*C09J 183/04* (2006.01)

(52) U.S. Cl.
CPC ................. *C09J 11/08* (2013.01); *C09J 5/00* (2013.01); *C09J 183/04* (2013.01); *C09J 2301/502* (2020.08); *C09J 2423/10* (2013.01); *C09J 2483/00* (2013.01)

(58) Field of Classification Search
CPC ... C09J 11/08; C09J 5/00; C09J 183/04; C09J 2301/502; C09J 2423/10; C09J 2483/00; C08G 77/12; C08G 77/20; C08K 2201/005; C08K 5/098; C08L 91/06; C08L 83/04; C08J 7/0427; C08J 2383/04; C08J 2423/12
See application file for complete search history.

(56) References Cited

U.S. PATENT DOCUMENTS 6,030,919 A 2/2000 Lewis
8,642,891 B2 2/2014 Berghmans et al.
9,556,336 B2 1/2017 Berghmans et al.
10,744,717 B2 * 8/2020 Gottschalk-Gaudig ...................... B29C 64/40
11,491,255 B2 * 11/2022 Langer-Anderson ........................ A61L 24/001
2004/0096686 A1 5/2004 Teoh et al.
2008/0014164 A1 * 1/2008 Jacquier ................... A61Q 1/10 424/70.7
2009/0162592 A1 * 6/2009 Baikerikar ............. B60J 10/345 524/588
2011/0155945 A1 * 6/2011 Soong .................... C08J 9/0066 252/514
2011/0300766 A1 12/2011 Carbary et al.
2012/0322942 A1 * 12/2012 Berghmans ............. C08L 83/04 524/852
2016/0347914 A1 * 12/2016 Overdulve .............. C08L 53/02
2018/0155570 A1 * 6/2018 Ledford ................. C09D 5/002

FOREIGN PATENT DOCUMENTS

FR 2960429 A1 * 12/2011 ........... A61K 8/8111
JP 2001-214063 A 8/2001
JP 2016-147929 A 8/2016

OTHER PUBLICATIONS

Geffroy, FR-2960429-MT (Year: 2011).*
Lewis et al., "Platimum catalysts Used in the Silicons Industry—Their Syntesis and Activity in Hidrosilylation", Platinum Metals Rev. 41(2): 66-75 (1997).
Amador et al., "A new microbial gluten-degrading prolyl endopeptidase: Potential application in celiac disease to reduce gluten immunogenic peptides", PLOS ONE: 1-22 (2019).
SHAMROCK Technical Data "S-400-N1 Micronized EBS Wax" (2017).
Micro Powders, Inc., "High Performance Wax Additives, Advanced technology with a quality difference" (2015).
Micro Powders, Inc., "High Performance Wax Additives" (2019).
Munzing, "LUBA-print 301/C" Technical Information (2012).
Munzing, "LUBA-print 2036A" Technical Information (2015).
Micro Powders, Inc., "Micropro 700", Technical Data (2017).
Micro Powders, Inc., "Micropro 400", Technical Data and Safety Data Sheet (test date Mar. 2019), downloaded in 2020.
Micro Powders, Inc., "Micropro 400", Technical Data Sheet (1996).
International Search Report and Written Opinion of the International Searching Authority for International Patent Application No. PCT/US2020/019330 mailed Jun. 19, 2020, 12 pages.
Extended European Search Report for EP Application No. 20759752.7, mailed Oct. 13, 2022, 7 pages total.

* cited by examiner

*Primary Examiner* — Mark Eashoo
*Assistant Examiner* — Zhen Liu
(74) *Attorney, Agent, or Firm* — Merchant & Gould, P.C.

(57) ABSTRACT

Disclosed herein is a silicone gel having a surface treated with an additive. The additive comprises a synthetic, micronized hydrocarbon wax selected from a polyethylene, a polytetrafluoroethylene, a polypropylene, an amide wax, and any combination thereof. Alternatively, the additive comprises a micronized metallic stearate. The additive has a melting point of at least 90° C., or from about 90° C. to about 160° C.

23 Claims, No Drawings

TACK REDUCTION FOR SILICONE GEL SEALS

CROSS-REFERENCE TO RELATED APPLICATION

This application a National Stage Application of PCT/US2020/019330, filed on Feb. 21, 2020, which claims the benefit of U.S. Patent Application Ser. No. 62/809,055, filed on Feb. 22, 2019, the disclosures of which is are incorporated herein by reference in its entirety their entireties. To the extent appropriate, a claim is made to each of the above disclosed application.

TECHNICAL FIELD

The present disclosure relates to silicone gels exhibiting reduced tackiness.

BACKGROUND

Closure systems are used to protect internal components from deterioration caused by external environments. For example, internal components such as fiber optic cables and copper cables typically have to be enclosed in water-tight closure systems. Other closure systems are commercially available for use with communication and energy transmission cables. Closure systems may include internal components such as fiber organizers, cable seals and termination devices, drop cable seals for a number of drops with drop cable termination devices, and universal splice holders for a number of splices. These internal components may be subject to environmental factors such as varying moisture levels, heat and cold, and exposure to other chemical substances. The closure systems are preferably protected from water-ingress with a sealant of some sort.

Sealants may be used in closure systems for insulation and for protection against water, corrosion and environmental degradation, and for thermal management. Thermoset gels such as silicone gels or polyurethane gels may be employed in closure systems. Dry silicone gels are thermoset gels containing relatively low amounts or no amount of diluent fluids such as unreactive silicone oil or mineral oil. Dry silicone gels may include less than 5 wt %, or little to no added unreactive silicone oil.

Gel seal arrangements for fiber optic cables apply pressure to gel contained therein causing the gel to conform to the fiber optic cables and overcome any penetrating fluid pressure (e.g., from air or water).

Silicone gels are classified as thermoset gels. Thermoset gels can be produced by chemical crosslinking. A dry silicone gel makes little to no use of an extra solvent or diluent fluid but can still be categorized under the term "gel" because of the similarity in physical properties and behavior, or because of its viscoelastic properties.

U.S. Pat. Nos. 8,642,891 and 9,556,336, Berghmans et al., disclose silicone dry gels suitable for use in closure or interconnect systems. Silicone dry gels were developed without use of a silicone oil to help avoid excessive oil bleed out. Dry silicone gels may be prepared from a vinyl-terminated polydimethylsiloxane (PDMS), a hydride containing crosslinker, and a hydride containing chain extender, for example, wherein the dry silicone gel has a hardness between 40 g and 300 g. The target hardness is needed to make the gel functional from its sealing perspective.

One problem with softer gels used in cable gel seal arrangements as well as for sealing enclosures is that the gels may be subject to significant tackiness. For example, silicone gels may suffer from an extremely high level of tackiness/stickiness which increases the softer the gel becomes. Consequently, handling of the gels becomes difficult.

For example, when silicone gel seals are formulated at a low enough hardness to seal effectively over a variety of cable sizes and geometries, the surface of the gel is tacky. It is relatively easy to handle initially upon installation of the cables and activating the seal by shutting the closure. However, after aging, the seals are extremely difficult to separate from the cables, each other, and to the areas of the closure to which the seals conform. Also, re-entry of fiber optic closures in the field after first installation is not possible in view of the tackiness/stickiness, although re-entry is key in some applications as a fiber optic network is constantly changing and additional customers need to be added over time. Silicone oil gels may also exhibit a need for reduced tack.

There is a need for improved silicone gels that exhibit a sufficiently low tack. There is also a need for improved silicone gels that can be more easily handled.

SUMMARY

The present disclosure provides a silicone gel having a surface treated with an additive to reduce tackiness of the gel. The additive may comprise a synthetic, micronized hydrocarbon wax selected from a polyethylene, a polytetrafluoroethylene, a polypropylene, an amide wax, an ethylene-bis(stearamide) wax, and any combination thereof. Alternatively, the additive comprises a micronized metallic stearate. The additive may have a melting point of at least 90° C., or from about 90° C. to about 160° C.

The disclosure provides a silicone gel having a surface treated with an additive, wherein the additive comprises a synthetic, micronized hydrocarbon wax comprising a polyethylene, a polytetrafluoroethylene, a polypropylene, an amide wax, an ethylene-bis(stearamide) wax and any combination thereof, or the additive comprises a micronized metallic stearate, and wherein the additive has a melting point of at least 90° C., or from about 90° C. to about 160° C.

The additive may comprises a synthetic, micronized hydrocarbon wax selected from polypropylene, polyethylene, polytetrafluoroethylene, amide wax, and any combination thereof. The additive may comprises a micronized metallic stearate.

The additive may have a mean particle size from about 3.0 μm to about 8.0 μm or a $D_{50}$ from about 5.5 μm to about 8.0 μm.

The silicone gel may comprise about 10 wt % or less of the additive.

The silicone gel may have a surface treated with an additive in suspension having a viscosity from about 5 mPa·s to about 60 mPa·s at 25° C.

The dry silicone gel may have a surface treated with an additive having a mean particle size from about 4.5 μm to about 7.5 μm. The additive may have a $D_{50}$ from about 5.5 μm to about 8.0 μm.

The silicone gel may comprise an additive that is a polyethylene.

The silicone gel may comprise an additive that is a polypropylene.

The silicone gel may comprise an additive that is a polypropylene having a melting point from about 140° C. to about 143° C. and a mean particle size from about 4.5 μm to about 7.5 μm.

The silicone gel may comprise an additive that is a combination of a polypropylene and a polytetrafluoroethylene and has a melting point from about 149° C. to about 154° C. and a mean particle size from about 5.0 μm to about 7.0 μm.

The silicone gel may comprise an additive that is a polyethylene having a melting point from about 130° C. to about 136° C., a $D_{50}$ from about 5.5 μm to about 7.0 μm, and a viscosity in suspension from about 5 mPa·s to about 15 mPa·s at 25° C.

The silicone gel may comprise an additive that is a polyethylene having a melting point from about 103° C. to about 114° C., a $D_{50}$ from about 6.0 μm to about 7.0 μm, and a viscosity in suspension from about 15 mPa·s to about 50 mPa·s at 25° C.

The silicone gel may comprise an additive that is a polyethylene having a melting point from about 103° C. to about 114° C., a $D_{50}$ from about 6.0 μm to about 8.0 μm, and a viscosity in suspension from about 15 mPa·s to about 60 mPa·s at 25° C.

The silicone gel may be prepared by mixing a base polymer having a Si-vinyl group, a crosslinker, and a chain extender to provide a mixture; curing the mixture; and treating a surface of the silicone gel with the additive by dusting, or by spraying, painting, or brushing the additive in a suspension liquid onto the surface.

The silicone gel may be a dry silicone gel or a silicone oil gel.

The treated silicone gel may exhibits one or more of an adhesiveness of no more than 2.5 mJ, or no more than 2.0 mJ, when measured by texture analyzer; a negative adhesive force of no more than 200 g, or no more than 170 g when measured by texture analyzer; and a tack time of no more than 1.0 seconds, or no more than 0.8 seconds when measured by texture analyzer.

A closure or interconnect system is provided comprising the silicone gel of the disclosure, wherein the closure or interconnect system is sealed with the treated silicone gel and requires no more than 10 lbf (<44 N), or no more than 5 lbf (<22 N) to open the closure or interconnect system.

DETAILED DESCRIPTION

Sealants are often used in closure systems for insulation and for protection against water, corrosion and environmental degradation, and for thermal management. Sealants suitable or closure systems may include thermoplastic gels or thermoset gels. Thermoset gels such as silicone gels or polyurethane gels may be employed in closure systems. Thermoset gels can be produced by chemical crosslinking.

The present disclosure provides silicone gels and gel seals exhibiting reduced tackiness for use in sealing closure or interconnect systems.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of a silicone gel or an additive as disclosed herein may be combined in any suitable manner in one or more embodiments. In the following description, numerous specific details are included to provide a thorough understanding of embodiments. One skilled in the relevant art will recognize, however, that the disclosure can be practiced without one or more of the specific details, or with other methods, components, materials, and so forth. In other instances, well-known structures, materials, or operations are not shown or described in detail to avoid obscuring aspects of the disclosure. Thus, it is to be understood that other embodiments may be utilized and changes may be made without departing from the scope of the present disclosure.

The following detailed description, therefore, is not to be taken in a limiting sense.

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular aspect of the present invention.

As used herein, the terms "comprise(s)," "include(s)," "having," "has," "contain(s)," and variants thereof, are intended to be open-ended transitional phrases, terms, or words that do not preclude the possibility of additional acts or structure.

Any concentration range, percentage range, or ratio range recited herein are to be understood to include concentrations, percentages, or ratios of any integer within that range and fractions thereof, such as one tenth and one hundredth of an integer, unless otherwise indicated. Also, any number range recited herein relating to any physical feature are to be understood to include any integer within the recited range, unless otherwise indicated.

The terms "a" and "an" as used above and elsewhere herein refer to "one or more" of the enumerated components. For example, "a" polymer refers to one polymer or a mixture comprising two or more polymers.

The term "and/or" refers to and encompasses any and all possible combinations of one or more of the associated listed items.

As used herein, the term "about" means within ten percent (10%) of the given value, either ten percent more than the given amount or ten percent less than the given amount, or both.

As used herein, the term "composition" refers to one or more of a compound, mixture, blend, alloy, polymer and/or copolymer.

The term "centiStokes" ($mm^2/s$, cSt) may be used as a measure of kinematic viscosity. Viscosity is a measurement of a fluids resistance to flow.

The term "centipoise" ($10^{-3}$N s/m2, cP) may be used as a measure of absolute viscosity. Conversion of absolute (dynamic) viscosity to kinematic viscosity depends on fluid density. Values of cSt from 1-200,000 may be similar to cP for fluids having density like water, or specific gravity of 1.

As provide herein, ranges are intended to include, at least, the numbers defining the bounds of the range.

Unless otherwise specified, % values refer to weight %.

The term "ambient room temperature" refers to 20-25° C. (68-77° F.).

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms used in the description, have the same meaning as commonly understood by one of ordinary skill in the art to which this disclosure belongs. In the event of conflicting terminology, the present specification is controlling. All patents, patent applications and publications referred to herein are incorporated by reference in their entirety.

As used herein, the term "silicone gel" refers to a chemically crosslinked polymer having a Si—O backbone. As opposed to carbon-based polymers, the crosslinked silicone polymers of silicone gels are based on a Si—O backbone. The characteristics of silicon and oxygen provide crosslinked polymers with their exceptional properties. For example, silicon forms stable tetrahedral structures, and silicon-oxygen bonds are relatively strong which results in silicone gels with high temperature resistance. In addition, crosslinked Si—O polymers have a relatively high chain flexibility as well as low rotational energy barrier.

As used herein, the term "silicone oil gel" also known as an "extended silicone gel" may refer to a silicone gel having a chemically crosslinked polymer with a Si—O backbone and comprising an amount of added non-reactive diluent fluid such as a non-reactive silicone oil or a mineral oil, for example, in an amount greater than or equal to 5 wt %, for example, from 5-80 wt %, 10-60 wt %, 20-55 wt %, or 30-50 wt %. The non-reactive diluent fluid may be, for example, a polydimethyl siloxane trimethyl (PDMS) terminated silicone oil fluid.

As used herein, the term "silicone dry gel" may refer to a chemically crosslinked polymer having a Si—O backbone and comprising less than 5 wt %, 3 wt %, 1 wt %, or no amount at all, of added diluent fluids such as non-reactive silicone oil or mineral oil.

The present disclosure relates to silicone gels exhibiting reduced tackiness.

The silicone gel may be a dry silicone gel or a silicone oil gel.

The treated silicone gels can better maintain their reduced tackiness over time, and in some cases, permanently.

The inventor has discovered that adding a small amount of certain additives to a surface of a silicone gel after curing provides significantly reduced tackiness. In particular, the inventor has discovered that adding a small amount of a synthetic, micronized hydrocarbon wax additive selected from a polyethylene, a polytetrafluoroethylene (PTFE), a polypropylene, an amide wax, and any combination thereof, where the synthetic, micronized hydrocarbon wax additive has a melting point of at least about 90° C., or from about 90° C. to about 160° C., to a surface of a silicone gel after curing provides significantly reduced tackiness. Similarly, the inventor has discovered that adding a small amount of a metallic stearate, where the metallic stearate has a melting point of at least about 90° C., or from about 90° C. to about 160° C., to a surface of a silicone gel after curing provides significantly reduced tackiness. Thus, the gels disclosed herein can be manufactured with ease (e.g., by dusting the additive onto the gel surface or by spraying, painting, brushing, or rolling the additive in a suspension liquid (e.g., a solvent such as an alcohol such as ethanol or isopropanol) onto the gel surface). In some embodiments, the additive has a mean particle size from about 3.0 μm to about 8.0 μm or a $D_{50}$ from about 5.5 μm to about 8.0 μm. In some embodiments, the additive has a mean particle size from about 4.5 μm to about 7.5 μm or a $D_{50}$ from about 5.5 μm to about 8.0 μm.

In some embodiments, the additive comprises the synthetic, micronized hydrocarbon wax selected from the polyethylene, the polytetrafluoroethylene, the polypropylene, the amide wax (e.g., a fatty amide wax), and any combination thereof. In some embodiments, the additive is a polyethylene wax. In some embodiments, the additive is a polypropylene wax. In some embodiments, the additive is a micronized ethylene-bis(stearamide) (EBS; N,N'-ethylenedi(stearamide)) wax.

In other embodiments, the additive comprises a micronized metallic stearate. Exemplary metallic stearates include calcium stearate, zinc stearate, magnesium stearate, aluminum stearates, and lithium stearate.

In some embodiments, the melting point of the additive is from about 90° C. to about 155° C. In certain embodiments, the melting point of the additive is from about 90° C. to about 120° C. In certain embodiments, the melting point of the additive is from about 90° C. to about 115° C.

In some embodiments, the melting point of the additive is from about 100° C. to about 155° C. In certain embodiments, the melting point of the additive is from about 100° C. to about 120° C. In certain embodiments, the melting point of the additive is from about 100° C. to about 115° C.

In some embodiments, the melting point of the additive from about 140° C. to about 160° C. In certain embodiments, the melting point of the additive is from about 145° C. to about 160° C. In certain embodiments, the melting point of the additive is from about 145° C. to about 155° C.

In some embodiments, the melting point of the additive is from about 130° C. to about 150° C. In certain embodiments, the melting point of the additive is from about 130° C. to about 140° C. In certain embodiments, the melting point of the additive is from about 140° C. to about 150° C. In other embodiments, the melting point of the additive is from about 140° C. to about 145° C.

In various embodiments, the melting point of the additive is from about 140° C. to about 143° C.; from about 149° C. to about 154° C.; from about 130° C. to about 136° C.; or from about 103° C. to about 114° C.

Mean particle size of the additive can vary, for example, from about 3.0 μm to about 8.0 μm; from about 4.5 μm to about 7.5 μm; from about 3.0 μm to about 5.0 μm, from about 5.0 μm to about 8.0 μm; or from about 5.0 μm to about 7.0 μm.

Alternatively, $D_{50}$ (average particle diameter by mass) of the additive can be from about 5.5 μm to about 8.0 μm; from about 5.5 μm to about 7.0 μm; from about 6.0 μm to about 8.0 μm; or from about 6.0 μm to about 7.0 μm.

In some embodiments, the additive (in suspension) has a viscosity from about 5 mPa·s to about 60 mPa·s at 25° C. In certain embodiments, the additive (in suspension) has a viscosity from about 15 mPa·s to about 60 mPa·s at 25° C. In certain embodiments, the additive (in suspension) has a viscosity from about 15 mPa·s to about 50 mPa·s at 25° C. In certain embodiments, the additive (in suspension) has a viscosity from about 5 mPa·s to about 15 mPa·s at 25° C.

The following are exemplary embodiments of the additive:

In an embodiment, the additive is a polypropylene having a melting point from about 140° C. to about 143° C. and a mean particle size from about 4.5 μm to about 7.5 μm. In another embodiment, the additive is a combination of a polypropylene and a polytetrafluoroethylene and has a melting point from about 149° C. to about 154° C. and a mean particle size from about 5.0 μm to about 7.0 μm. In an embodiment, the additive is a polyethylene having a melting point from about 130° C. to about 136° C., a $D_{50}$ from about 5.5 μm to about 7.0 μm, and a viscosity in suspension from about 5 mPa·s to about 15 mPa·s at 25° C. In another embodiment, the additive is a polyethylene having a melting point from about 103° C. to about 114° C., a $D_{50}$ from about 6.0 μm to about 7.0 μm, and a viscosity in suspension from about 15 mPa·s to about 50 mPa·s at 25° C. In yet another embodiment, the additive is a polyethylene having a melting point from about 103° C. to about 114° C., a $D_{50}$ from about 6.0 μm to about 8.0 μm, and a viscosity in suspension from about 15 mPa·s to about 60 mPa·s at 25° C.

In some embodiments, the gel comprises about 10 wt % or less of the additive. In certain embodiments, the gel comprises about 8 wt % or less of the additive. In certain embodiments, the gel comprises about 6 wt % or less of the additive. In certain embodiments, the gel comprises about 5 wt % or less of the additive. In certain embodiments, the gel comprises about 4 wt % or less of the additive. In certain embodiments, the gel comprises about 2 wt % or less of the additive. In other embodiments, the gel comprises about 1 wt % or less of the additive. In some embodiments, the gel comprises about 0.5 wt % or less of the additive. In some embodiments, the gel comprises about 0.1 wt % or less of the additive. These weight percentages are based on the final total gel weight.

Additives may be, for example, commercially available synthetic micronized hydrocarbon waxes having a melting point of at least about 90° C.; or within a range of from about 90° C. to about 160° C. In some embodiments, the micronized wax is not soluble in the silicone system and/or due to difference in structure are not likely to be absorbed or absorbed only slowly into silicone gel network. In some embodiments, the additive may be MICRPRO 400 (synthetic modified polypropylene wax, Micro Powders, Inc., Tarrytown, NY) (typical properties, m.p. 140-143° C., mean particle size 4.5-7.5 μm, maximum particle size 22 μm, density @ 25° C.=0.94 g/cc); MICROPRO 700 (synthetic modified polypropylene wax/PTFE, Micro Powders, Inc., Tarrytown, NY) (typical properties, m.p. 149-154° C., mean particle size 5.0-7.0 μm, maximum particle size 22 μm, density @ 25° C.=1.04 g/cc); LUBA-print® 2036A (polyethylene wax dispersion in ethanol, Munzing Chemie GmbH, Abstatt, Germany) (m.p. 130-136° C., particle size d50 5.5-7.0 μM, particle size d98<=18.0 μM, viscosity 5 mPa·s-15 mPa·s (Rheolab MC1 DIN 53019 1.291s-1)); LUBA-print® 301/C (polyethylene wax dispersion in ethanol, Munzing Chemie GmbH, Abstatt, Germany) (m.p. 103-114° C., particle size d50 6.0-7.0 μM, particle size d98<=18.0 μM, density 0.82 g/ccm, viscosity 15 mPa·s-50 mPa·s (Rheolab MC1 DIN 53019 1.291s-1)); Fluo 625F (micronized PTFE wax, Micro Powders, Inc., Tarrytown, NY) (m.p.>316° C.; density at 25° C.=2.2 g/cc; maximum particle size 44 μM, mean particle size 9.0-13.0 μM); Polyfluo 120 (micronized polyethylene wax and PTFE, Micro Powders, Inc., Tarrytown, NY) (m.p.=107-110° C., density at 25° C.=0.98 g/cc, maximum particle size 31 μm, mean particle size 6-10 μM); MPP 620F (polyethylene wax, Micro Powders, Inc., Tarrytown, NY) (m.p.=114-116° C., density at 25° C. 0.96 g/cc, maximum particle size 31.0 μm, mean particle size 7.0-9.0 μm); Superslip 6525 (combination of polyethylene and amide wax, Micro Powders, Inc., Tarrytown, NY) (m.p.=135-145° C., density at 25° C. 0.95 g/cc, mean particle size 6.0-8.0 μm, maximum particle size 22.0 μm); CERETAN® MA7020 (micronized ethylene-bis-stearamide wax (EBS), Munzing Chemie GmbH, Abstatt, Germany) (drop point 143-151° C., (DGF M-III 3), maximum particle size 99%<20 mm, mean particle size 50%<5 mm); and/or LUBA-print® 103/A-neu (zinc stearate wax dispersion in butyl acetate, Munzing Chemie GmbH, Abstatt, Germany) (m.p.=121-127° C., D98=10 μm, D50=4 μm).

Dry silicone gels may be produced by the methods of U.S. Pat. Nos. 8,642,891 and 9,556,336, Berghmans et al., disclosing soft silicone dry gels suitable for use in closure or interconnect systems, prepared from a vinyl-terminated polydimethylsiloxane (PDMS), a hydride containing crosslinker, and a hydride containing chain extender, for example, wherein the dry silicone gel has a final hardness between 40 g and 300 g.

Soft silicone gels are suitable for use in cable gel sealing arrangements, but may be subject to significant tackiness. In particular, silicon gels may show a highly tacky surface due to the excess vinyl groups at the surface. This may be related to the formulation stoichiometry of components A (PDMS vinyl groups) and B (Hydride groups from the crosslinker and extender chains), which may be tailored to reach a target hardness. The target hardness is needed to make the gel functional from its sealing perspective. The tackiness/stickiness of the silicone gel may increase, the softer the gel becomes. Consequently, handling of the gels becomes difficult. Also, re-entry of fiber optic closures in the field after first installation may be made difficult in view of the tackiness/stickiness. Re-entry however is key in some applications, for example, in a fiber optic network that is constantly changing, for example, by adding customers over time.

As disclosed herein, use of a surface treatment such as a finely micronized, modified polypropylene wax, such as MICROPRO400 (Micro Powders, Inc., NY, USA) when applied to a surface of the silicone gel may reduce tackiness of the gel and improve handling characteristics such as ease of re-entry.

The silicone gels of the disclosure may be made according to a number of different polymerization reactions. In certain embodiments, the polymerization reaction is a hydrosilylation reaction, also referred to as a hydrosilation reaction. In some embodiments, the hydrosilylation reaction makes use of a platinum catalyst, while other embodiments make use of radicals. In further embodiments, the silicone gel is made by a dehydrogenated coupling reaction. In other embodiments, the silicone gel is made by a condensation cure RTV reaction.

The silicone gel may be made by reacting at least a crosslinker, a base polymer (e.g., a vinyl-terminated polydimethylsiloxane), and optionally a chain extender in the absence or presence of non-reactive silicone oil. A catalyst may be included to speed up the reaction. In additional embodiments, an inhibitor may be used to slow down the rate of reaction. Exemplary components of the silicone gels, their resulting properties, and their end-use are described in greater detail below.

In embodiments, the silicone gel is prepared from a composition comprising a base polymer having a Si-vinyl group. In other embodiments, the silicone gel is prepared from a composition comprising monomers that upon a chemical reaction and crosslinking provide crosslinked silicone polymers having a Si—O backbone. In embodiments, preparing the silicone gel comprises mixing a base polymer having a Si-vinyl group (e.g., a vinyl-terminated polydimethylsiloxane), a crosslinker, and a chain extender.

In certain embodiments, the silicone gel may be made by an addition cure or platinum cure reaction mechanism. In some embodiments, the mechanism may employ the use of a catalyst. By using a catalyst, the activation energy of the reaction is typically lowered and faster curing times at lower temperatures can be achieved. A schematic overview of the platinum cure reaction mechanism is shown below in (I).

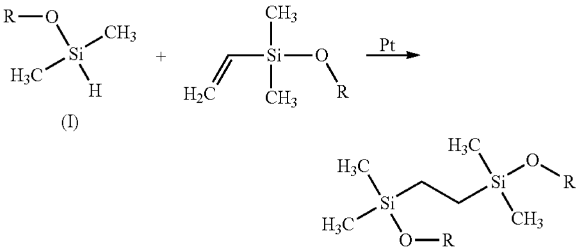

(I)

For the reaction in (I) to be made possible, two functional groups must react with each other. In certain embodiments, the two functionalities are (1) the Si—H (hydride) group and (2) the Si-vinyl group. These two functionalities may be provided by: (1) a base polymer, (2) a crosslinker, and (3) a chain extender.

Base Polymer

In certain embodiments, the Si-vinyl group may be provided by a base polymer such as a vinyl terminated polydimethylsiloxane (otherwise referred to as "V-PDMS"), which is shown below in (II). In this example, the base polymer compound comprises a vinyl group at each end of the compound.

(II)

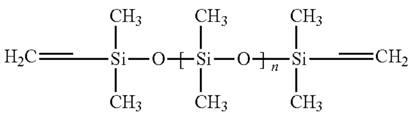

In certain embodiments, the molecular weight of the base polymer may be controlled through anionic ring-opening polymerization of cyclic siloxanes in the presence of alkali-metal hydroxide of a base that is volatile (e.g., tetramethylammonium silanolate). Encapping of the PDMS with a vinyl group may be needed, so these groups are added to the polymerization mixture. V-PDMS together with the chain extender determine the molecular weight between the different crosslink sites.

The vinyl-containing base polymer, such as V-PDMS, may have different viscosities that affect the resulting silicone gel. In general a high molecular weight V-PDMS will produce an uncured gel with a higher viscosity. In certain embodiments, a lower molecular weight V-PDMS generally improves processability.

The hardness of the silicone gel may depend upon the number of vinyl groups that are unreacted both at the surface of the gel and inside the gel. The excess unreacted vinyl groups result in the gel being softer and also causes the gel to be subject to tackiness.

Stated another way, the hardness of the silicone gel may depend on the crosslink density and the molecular weight between crosslinks. As the crosslink density per unit volume increases, the hardness increases. As the molecular weight between crosslinks decreases, the hardness increases. Unreacted vinyl groups increase the tackiness of the gel. Chain ends also increase the tackiness of the gel. The number of chain ends increases as the molecular weight between crosslinks increases and the crosslink density decreases.

A silicone gel is provided having at least one surface coated with an additive comprising a synthetic, micronized hydrocarbon wax or micronized metallic stearate, wherein the additive has a melting point at least about 90° C., or between about 90° C. to about 160° C. The silicone gel may be prepared by a method comprising: providing a first set of components comprising: (1) a base polymer having a vinyl-silicone group, and (2) an addition cure catalyst; providing a second set of components comprising: (1) a crosslinker having three or four Si—H groups, (2) optionally a chain extender having two Si—H groups, and (3) additional base polymer having a vinyl-silicone group; mixing the first and second set of components together to form the silicone gel; and treating at least one surface of the silicone gel with the additive. The method may include pouring the mixture of the first and second components into a mold; and curing the molded mixture to form the silicone gel. The additive may be applied to at least one surface, or all surfaces of the silicone gel comprising spraying, brushing, dipping, or rolling. The mixture of first and second components may comprise a mole fraction of hydride present as crosslinker between 0.2 and 0.5. In some embodiments, the silicone gel is a silicone dry gel. In some embodiments, the silicone gel is a silicone oil gel, wherein first and/or second components include a non-reactive silicone oil.

The base polymer and additional base polymer may each be a vinyl-containing polydialkylsiloxane, polyalkylarylsiloxane, or polydiarylsiloxane including vinyl polymers and copolymers. For example, the vinyl-containing base polymer may contain any of the following monomers: dimethyl, diethyl, vinylmethyl, diphenyl, phenylmethyl, trifluoropropylmethyl, nonafluorohexamethyl, dimethoxy, and diethoxy. In addition to di-vinyl terminated base polymers, alpha-vinyl, omega-hydride terminated polymers may be employed as a substantial portion of the gel polymer.

In some embodiments, the base polymer and additional base polymer may be a vinyl-terminated polydimethylsiloxane (V-PDMS).

The vinyl-containing base polymer, such as V-PDMS, may have different viscosities that affect the resulting silicone gel. In general, a high molecular weight V-PDMS will produce an uncured gel with a higher viscosity. In certain embodiments, a low molecular weight V-PDMS generally improves processability.

The V-PDMS used in the silicone gel may have a viscosity between approximately 100 and 165,000 cSt (100-165,000 $mm^2/s$), between approximately 1000 and 100,000 cSt (1000-100,000 $mm^2/s$), between approximately 1000 cSt and 60,000 cSt (1000-60,000 $mm^2/s$), between approximately 3000 cSt and 7000 cSt (3000-7000 $mm^2/s$), or between approximately 4500 cSt and 5500 cSt (4500-5500 $mm^2/s$).

The vinyl-terminated polydimethylsiloxane may have an average molecular weight between about 6,000 g/mol and about 170,000 g/mol, between about 28,000 g/mol and about 72,000 g/mol. The vinyl-terminated polydimethylsiloxane may have an average molecular weight of approximately 49,500 g/mol.

The base polymer may contain between approximately 1 and 10 mol of vinyl per 500,000 g/mol of V-PDMS. In one embodiment, the base polymer contains approximately 2 mol of vinyl per mol of V-PDMS. In yet other embodiments, the vinyl content of the V-PDMS is between approximately 0.01 and 0.1 equivalent/kg, or between approximately 0.036 and 0.07 eq/kg, or between approximately 0.04 and 0.05 eq/kg.

The amount of base polymer in the first and/or second set of components for forming the silicone gel composition may be between 40-99.99 wt %, between 45-99.95 wt %, or between 50-99 wt %. The amount of base polymer in the first and/or second set of components for forming the dry silicone gel composition may be between 85-99.99 wt %, between 90-99.95 wt %, or between 95-99 wt %. The amount of base polymer in the silicone oil gel composition may be between 40-90 wt %, between 45-80 wt %, or between 50-65 wt %.

Crosslinker

In certain embodiments, the Si—H end groups for the reaction in (I) may be provided by a crosslinker and/or a chain extender. A crosslinker is capable of forming connections between vinyl-terminated polydimethylsiloxane chains. In certain embodiments, the crosslinker includes electronegative substituents such as alkylsiloxy or chlorine. In some embodiments, the crosslinker may have three or four or more Si—H groups that are capable of forming a connection point between three or four different vinyl-terminated polydimethylsiloxane chains, respectively. The crosslinker may have four Si—H groups. In one embodiment, the crosslinker comprises four Si—H groups that are capable of forming a connection point between four different vinyl-terminated polydimethylsiloxane chains. For example, the crosslinker may be tetrakis(dimethylsiloxy)silane, shown below in (III), or 1,3-diphenyltetrakis(dimethylsiloxy) disiloxane. In other embodiments, the crosslinker may include three Si—H hydride groups, for example, the crosslinker may be methyltris(dimethylsiloxy)silane or phenyltris (dimethylsiloxy)silane.

(III)

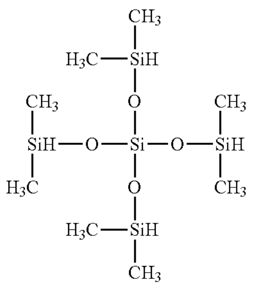

In other embodiments, the crosslinker may be methyltris (dimethylsiloxy)silane. For example, cross linkers may include Gelest SIT 7278 tetrakis dimethyl siloxy silane and/or Gelest SIP 6826, phenyl tris dimethyl siloxy silane. Other crosslinkers may also be used. For example, crosslinker may include phenyltris(dimethylsiloxy)silane (e.g., CAS 18027-45-7) to improve tear resistance of the silicone gel. Using higher functional crosslinkers is also possible, but these form less defined polymer structures.

Chain Extender

In addition to the crosslinker, the Si—H end group may be provided by a chain extender, wherein both ends of the chain extender compound are terminated with a Si—H group.

In certain embodiments, the chain extender comprises reactive groups that are compatible and are willing to react with the vinyl groups in the base polymer. Just as for the crosslinker, these groups are Si—H groups that can react in a hydrosilation reaction. The chain extender typically includes two functional groups; however, the chain extender may include three of more functional groups, such that the chain extender functions as a branching agent. The functional groups may be the same as or different from each other. The functional groups may also be the same as or different than the functional groups of the first component and/or the second component.

The chain extender may be any chain extender known in the art. In one embodiment, the chain extender is a hydride containing polydimethylsiloxane. In another embodiment, the chain extender is a hydride terminated polydimethylsiloxane, shown below in (IV).

(IV)

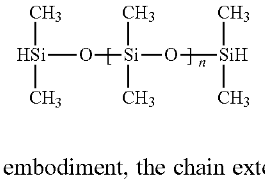

In a further embodiment, the chain extender is a hydride terminated polyphenylmethylsiloxane. In another embodiment, the chain extender is a hydride terminated polydiphenylsiloxane. In yet another embodiment, the chain extender is a dihydride containing siloxane. The chain extender may have a high molecular weight or a low molecular weight. The chain extender may also be branched or unbranched. In other embodiments, the chain extender is a high molecular weight polydimethylsiloxane. In other embodiments, the chain extender is a low molecular weight polydimethylsiloxane.

In other embodiments, the chain extender is a functionally-terminated silicone such as a silanol terminated, vinyl terminated, and amino terminated polydimethylsiloxane. Such silicones have low tear strength and can be toughened by incorporating fumed silica ($SiO_2$) into the structure. For example, an alkoxy-functionalized siloxane can be included. Suitable alkoxy-functionalized siloxanes include polydiethoxysiloxane, tetraethoxy silane, tetramethoxy silane, and polydimethoxy siloxane. In other embodiments, the chain extender is a fluorosilicone, phenyl silicone, or a branching diethyl silicone.

In certain embodiments, by making use of the chain extender molecule, the V-PDMS base polymer can be shorter because the H-PDMS chain extender will extend the V-PDMS base polymer chain in situ between two crosslinker compounds. By using this mechanism, a V-PDMS chain of a shorter length can be applied which leads to lower viscosities and compounds that are easier to work with. Therefore, lower viscosity base polymer compounds can be used unlike a peroxide activated cure reaction mechanism. For example, a peroxide activated cure mechanism may make use of polymer chains with viscosities of approximately 2,000,000 cSt (2,000,000 $mm^2/s$) while in the platinum cure mechanism may allow for base polymer chains (V-PDMS) having viscosities of approximately 5,000 cSt (5,000 $mm^2/s$).

MFHC and H/V Ratios

The amounts of crosslinker and chain extender that provide the hydride component may be varied. In certain embodiments, the amount of hydride in the gel is defined in terms of the mole fraction of hydride present as crosslinker ("MFHC"). For example, when the MFHC value is 0.3 or 30%, this means that 30% of the hydrides present in the system are part of the crosslinker and the remaining 70% of the hydrides are provided by the chain extender. In certain embodiments, the MFHC ratio may be altered to adjust the hardness of the gel (i.e., an increase in the MFHC may increase the hardness). In certain embodiments, the MFHC value is greater than 0.2, 0.3, 0.4, or 0.5. In some embodiments, the MFHC value is between 0.2 and 0.5. In other embodiments, the MFHC value is between 0.3 and 0.4.

The overall amount of hydride components in the gel can also vary. The ratio of hydride to vinyl components (provided by the base polymer) can be defined as "H/V". In other words, H/V is the total moles of hydride (contributions from crosslinker and chain extender) divided by the amount in moles of vinyl from the base polymer (e.g., V-PDMS) present. In certain embodiments, the silicone gel has a H/V ratio between 0.5 and 1.0, between 0.6 and 1.0, between 0.7 and 1.0, between 0.8 and 1.0, or between 0.9 and 1.0. If the H/V ratio is greater than 1, this means that there are more hydride groups present in the system than vinyl groups. In theory, the silicone gel may have a maximum hardness where the H/V ratio is 1 (this is the theoretical point where all the groups react with each other.) However, in practice this is not always the case and the maximum will be situated in the neighborhood of H/V equals 1. In certain embodiments, the silicone gel may comprise slightly less hydrides than vinyl groups (i.e., the H/V is less than but close to 1) in order to obtain a desired hardness. This is because gels with H/V values greater than 1 may undergo undesired post-hardening of the gel. As a result, when achieving the target hardness, there may be an excess of vinyl groups at the surface of the gel which may cause excess tackiness.

A schematic overview of the reaction is depicted in (V) below, wherein the crosslinker compounds are represented by "+", the chain extender compounds are represented by "=", and the base polymer V-PDMS compounds are represented by "–". In certain embodiments, the chain extender must always connect two different base polymer compounds, or connect to one base polymer and terminate the chain on the opposite end.

(V)

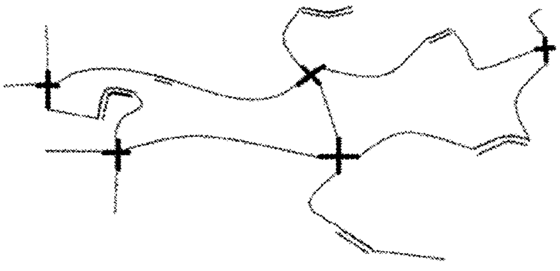

Catalyst

In certain embodiments, an addition cure catalyst is used in reacting the base polymer, crosslinker, and chain extender. Performing the reaction without using a catalyst is typically a very energy consuming process. Temperatures of 300° C. or even higher are needed in order to avoid the produced gel having poor and inconsistent mechanical properties.

The catalyst may include a Group VIII metal. Platinum catalyst can be prepared according to methods disclosed in the art, e.g., Lewis, Platinum Metals Rev., 1997, 41, (2), 66-75, and U.S. Pat. No. 6,030,919, herein incorporated by reference. In another embodiment, the catalyst is a homogenous catalyst. In other embodiments, the catalyst is a heterogeneous catalyst. Examples of heterogeneous catalysts include platinum coated onto carbon or alumina. In certain embodiments, the catalyst comprises platinum. For example, the catalyst can be made of Pt complexed with divinyltetramethyldisiloxane, shown below in (VI). Platinum divinyltetramethyldisiloxane complex is commercially available as, for example, SIP 6830.3, Gelest Inc.

(VI)

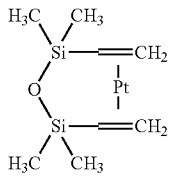

An advantage of this catalyst is the fact that no heterogeneous reaction is taking place but that the catalyst will form a colloid. An advantage of these catalysts is the fact that only a small amount (~ppm level) is needed. This may reduce the cost of the polymerization process.

The catalyst may be a rhodium chloride complex, e.g., tris(triphenylphosphine) rhodium chloride ("Wilkinson's catalyst"). Rhodium based catalysts may require higher concentrations and higher reaction temperatures to be successful to a large extent. But poisoning comes together with reactivity; and therefore rhodium based catalysts may be less easily poisoned than platinum catalysts.

Inhibitor

In certain embodiments, inhibitors are added in the silicone gel formulation to slow down the curing process. Slowing down the curing process allows more time to work with the polymer mixture during processing, dispensing, and molding.

The inhibitor can bind to the catalyst and form a stable complex. By doing this, the Pt catalyst is deactivated. When the complex is activated by adding energy (raising the temperature) the inhibitor will lose its binding for the Pt-catalyst. After this, the Pt-catalyst is in its activated form again and the polymerization reaction can start. The inhibitor may help manipulate the gel before it fully cures and extend the pot life. In certain embodiments, the pot life may be approximately 1 hour at room temperature and 6-8 hours at 3° C.

In certain embodiments, the inhibitor may comprise two electron-rich groups (alcohol- and allylfunction) forming an acetylenic alcohol. These groups can interact with the catalyst and shield it from other reactive groups. The inhibitor may be, for example, 2,2',4,4'-Tetrahydroxybenzophenone (e.g., Aldrich 27,839-4). The inhibitor of a Pt-catalyst may be, for example, 3,5-Dimethyl-1-hexyn-3-ol, shown below in (VII).

(VII)

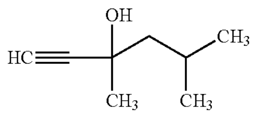

The silicone gel composition may comprise additional common components. For example, the compositions may include additives such as flame retardants, coloring agents, adhesion promoters, stabilizers, fillers, dispersants, flow improvers, plasticizers, slip agents, toughening agents, and combinations thereof. In certain embodiments, the additional additives may include at least one material selected from the group consisting of Dynasylan 40, PDM 1922, Songnox 1024, Kingnox 76, DHT-4A, Kingsorb, copolymers, pigment, and mixtures thereof. In some embodiments, the additives comprise between 0.1 and 25 wt % of the overall composition, between 0.1 and 5 wt % of the overall composition, between 0.1 and 2 wt % of the overall composition, or between 0.1 and 1 wt % of the overall composition.

In some embodiments, the compositions disclosed and by methods disclosed herein comprise a flame retardant. In certain embodiments, the flame retardant is zinc oxide. In some embodiments, the flame retardant comprises between 0.1 and 25 wt % of the overall composition, between 0.1 and 5 wt % of the overall composition, between 0.1 and 2 wt % of the overall composition, or between 0.1 and 1 wt % of the overall composition. In one embodiment, the flame retardant comprises 20 wt % of the overall gel composition.

In some embodiments, the compositions disclosed and made by methods disclosed herein contain at least one stabilizer. Stabilizers include antioxidants, acid-scavengers, light and UV absorbers/stabilizers, heat stabilizers, metal deactivators, free radical scavengers, carbon black, and antifungal agents.

Making the Silicone Gel

The silicone gel may be prepared by mixing a first set of components together, mixing a second set of components together, and then mixing the two sets of components together. The first set of components comprises blending the base polymer (e.g., V-PDMS) with the catalyst and optionally a non-reactive silicone oil. The second set of components comprises blending the crosslinker and chain extender. The second set of components may also comprise blending additional base polymer, optionally a non-reactive silicone oil, and optionally an inhibitor. In some embodiments, the first and/or second set of components may also comprise blending at least one of the additives discussed above. In certain embodiments, the amount of catalyst present in the first set of components is between 0.01-1 wt %, between 0.05-0.1 wt %, or approximately 0.083 wt %. In some embodiments, the remainder of the first set of components is the base polymer.

Regarding the second set of components, in certain embodiments for a silicone gel, the amount of crosslinker is between 0.1-1 wt %, between 0.2-0.4 wt %, or approximately 0.3 wt %. In certain embodiments, the amount of chain extender in the second set of components is between 0.5-5 wt %, between 1-3 wt %, or between 1.5-2.5 wt %. In some embodiments, the amount of inhibitor in the second set of components is between 0.01-0.1 wt %, between 0.1-0.5 wt %, or approximately 0.04 wt %. In other embodiments, the amount of base polymer in the second set of components is between 95-99.9 wt %, between 96-99 wt %, or between 97-98.5 wt %.

In certain embodiments, the amount of combined crosslinker and chain extender, for example, in an overall dry silicone gel composition is between 0.1-5 wt %, between 0.5-2 wt %, between 0.75-1.5 wt %, or approximately 1.25 wt %.

A method is provided for making a dry silicone gel having at least one surface coated with an additive comprising a synthetic, micronized hydrocarbon wax or micronized metallic stearate, wherein the additive has a melting point at least about 90° C., or between about 90° C. to about 160° C. The silicone gel may be prepared by a method comprising: providing a first set of components comprising: (1) a base polymer having a vinyl-silicone group, and (2) an addition cure catalyst; providing a second set of components comprising: (1) a crosslinker having three or four Si—H groups, (2) optionally a chain extender having two Si—H groups, and (3) additional base polymer having a vinyl-silicone group; mixing the first and second set of components together to form the silicone gel; and treating at least one surface of the silicone gel with the additive. The method may include pouring the mixture of the first and second components into a mold; and curing the molded mixture to form the silicone gel. The additive may be applied to at least one surface, or all surfaces of the silicone gel comprising spraying, brushing, dipping, or rolling.

A method is provided for making a silicone oil gel having at least one surface coated with an additive comprising a synthetic, micronized hydrocarbon wax or micronized metallic stearate, wherein the additive has a melting point at least about 90° C., or between about 90° C. to about 160° C., the method comprising is provided comprising: providing a first set of components comprising: (1) a base polymer having a vinyl-silicone group, (2) an addition cure catalyst, and optionally (3) a non-reactive silicone oil; providing a second set of components comprising: (1) a crosslinker, (2) additional base polymer having a vinyl-silicone group, and optionally (3) a non-reactive silicone oil; mixing the first and second set of components together to form a silicone gel composition; molding and curing the silicone gel composition to form the silicone gel; and treating at least one surface of the silicone gel with the additive. The method may include pouring the mixture of the first and second components into a mold; and curing the molded mixture to form the silicone gel. The additive may be applied to at least one surface, or all surfaces of the silicone gel comprising spraying, brushing, dipping, or rolling.

The silicone oil gel composition may include 5-80 wt %, 10-60 wt %, 20-55 wt %, or 30-50 wt % of the non-reactive silicone oil. The first and/or second set of components comprises the non-reactive silicone oil.

The non-reactive silicone oil may be a trimethylsiloxy-terminated or silanol-terminated polydialkylsiloxane. The non-reactive silicone oil may be a trimethylsiloxy-terminated polydimethylsiloxane. The non-reactive silicone oil may have viscosity of between about 10-30,000 cSt (10-30,000 $mm^2/s$), 20-5,000 cSt (20-5,000 $mm^2/s$), 50-1,000 cSt (50-1,000 $mm^2/s$), or 50-350 cSt (50-350 $mm^2/s$).

The second set of components may further comprise a chain extender.

The base polymer and additional base polymer may each be a vinyl-terminated polydimethylsiloxane. The base polymer and additional base polymer may each have one or more of the following properties: (a) a molecular weight between 6,000 g/mol and 170,000 g/mol; (b) a viscosity between 100 $mm^2/s$ and 165,000 $mm^2/s$; and (c) a vinyl content between 0.01 eq/kg and 0.1 eq/kg. The silicone gel composition may include the base polymer and additional base polymer in an amount between 40-90 wt %, between 45-80 wt %, or between 50-65 wt %.

The crosslinker may have >2 or <10 Si—H hydride moieties per molecule. The crosslinker may have three or four Si—H hydride moieties per molecule. The crosslinker may be selected from the group consisting of tetrakis (dimethylsiloxy)silane, methyltris(dimethylsiloxy)silane, phenyltris(dimethylsiloxy)silane and combinations thereof.

The chain extender may have two Si—H hydride moieties per molecule. In the silicone gel composition, the mole fraction hydride present as crosslinker (MFHC) may be from about 0.2 to about 0.5, or from about 0.3 to about 0.4. In the silicone gel composition, the hydride to vinyl ratio may be between about 0.8 and 1.0. The chain extender may be a hydride containing polydimethylsiloxane, hydride terminated polydimethylsiloxane, hydride terminated polyphenylmethylsiloxane, hydride terminated polydiphenylsiloxane, a functionalized hydride terminated silicone, and combinations thereof.

The silicone gel may be prepared by mixing the first set of components with the second set of components. The weight percent ratio between the first set of components and the second set of components may be between approximately 47.5:52.5 and 52.5:47.5, 49:51 and 51:49, or about 1:1. In one embodiment, the weight ratio of the blend of the first set of components to the second set of components is approximately 1:1. In another embodiment, the weight ratio of the blend is between approximately 47.5:52.5 and 52.5:47.5. Adjusting the ratio slightly can cause large differences in the overall hardness of the silicone gel. For example, in certain embodiments, when the ratio is 52.5:47.5 between the first and second set of components (wherein the second set of components comprises V-PDMS, crosslinker, chain extender, and inhibitor), the hardness may be lower than the hardness of the same composition at the 1:1 blending ratio. Additionally, in certain embodiments, when the ratio is 47.5:52.5 between the first and second set of components, the hardness may be greater than hardness of the same composition at the 1:1 blending ratio. In one example, the hardness may be approximately 72 g at the 52.5:47.5 ratio, 140 g at the 1:1 ratio, and about 210 g at the 47.5:52.5 ratio. In other words, a 2.5% variation may affect the hardness of the gel by as much as 70 g.

As used herein, the term "curing" refers to chemical crosslinking of polymer chains upon introduction of some type of reaction accelerant such as heat or UV light. Thus, "curing" is distinguished from reaction and crosslinking that occurs at room temperature. "Curing" requires some kind of accelerant of the reaction. "Curing" does not occur upon mere mixing of gel-forming components.

Uses and Properties of the Silicone Gel

The silicone gels having at least one surface coated with an additive described herein may be used in a number of end uses due to their improved properties, such as improved behavior in mechanical stresses (e.g., vibration and shock) or ability to seal uneven or complicated structures (due to the ability to flow and adapt to the area of the structure). In certain embodiments, the treated silicone gels may be used in an interconnect, cover, or closure system. In particular, the silicone gel may be used in a fiber optic closure, electrical sealant, or electrical closure. In some embodiments, the silicone gels are used as gel wraps, clamshells, or gel caps. In further embodiments, the silicone gels are used in the inside of a residence. In other embodiments, the silicone gels are used outside of a residence. Use of the silicone gel within a closure or interconnect system may allow for a reduction in the number of components, frame size, or cost over other sealing mechanisms. The silicone gel disclosed herein can be used in an enclosure or interconnect system as a sealant on cables entering and exiting the enclosure. The cables can be fiber optic cables, copper cables, or any combination thereof. In embodiments, during such use, the silicone gel is under a sealing pressure from about 20 kPa to about 200 kPa. In other embodiments, during such use, the silicone gel is under a sealing pressure from about 50 kPa to about 150 kPa.

The silicone gel exhibits certain desirable measurable properties. For example, in some embodiments, the silicone gel may exhibit a hardness in the range of 14 to 53 Shore 000 hardness, or 40 to 300 g; or 14 to 42 Shore 000 Hardness, or 40 to 200 g, as measured according to methods known in the art. In certain embodiments, the Shore hardness gauge may be measured according to ISO868 or ASTM D2240, or by a Texture Analyzer, as described herein.

In certain embodiments, hardness of the silicone gel can be measured on a texture analyzer. For example, a LFRA Texture Analyzer-Brookfield may include a probe assembly fixed to a motor driven, bi-directional load cell. In such a system, the probe is driven vertically into the sample at a pre-set speed and to a pre-set depth. For example, a probe comprising a stainless steel ball having diameter of 6.35 mm, and a probe speed of 2 mm/sec may be used with a target depth of 4 mm, and a hold time of 60 seconds. The trigger point may be 4 grams. The hardness is the amount of force needed to push the probe into the test sample. The $H_{60s}$, 60 second hardness value, or 60 second peak load hardness, should not exceed 250 g. The preferred $H_{60s}$ hardness range is less than 200 g and most preferred is less than about 120 g. Similarly, to obtain acceptable mechanical properties and the ability of the closure to be opened and resealed, a minimum 60 s hardness of about 40 g is required. The gels of the disclosure may exhibit $H_{60s}$ hardness in the range of 40 to 200 g, 50 to 150 g, or about 60 to about 140 g. In some embodiments, the final load hardness may be from 40 to 200 g, 50 to 150 g, or from about 60 to about 85 g. In some embodiments, the silicone gel may have a hardness in the range of 16 to 37 Shore OOO, or 50 to 160 g. In yet other embodiments, the silicone gel has a hardness in the range of 18 to 33 Shore OOO, or 60 to 140 g.

The silicone gel may exhibits certain desirable tack properties such as tackiness, adhesive force, adhesion (adhesiveness), and/or tack time. The tack properties may be measured may be measured using a Texture Analyzer, for example, a Brookfield RAY-K-00184. For example, the texture analyzer may be fitted with a cylindrical aluminum probe with a diameter of 20 mm, using 700 g aluminum probe, with a trigger load of 4 g, a probe speed of 2.0 mm/sec and a hold time of 15 sec. Adhesion (adhesiveness) is the area under the force vs. distance curve for all negative values of load detected at the end of the test as the probe returns to the home position, reported in mJ. Adhesive force is the peak negative value, for example, reported in g. Adhesive force (N), or negative adhesive force to remove probe from the gel (g), adhesiveness (mJ), and tack time (s) may be measured. Adhesiveness is a measure of stickiness and is calculated as the area under the negative peak as probe withdraws after the first compression.

In some embodiments for the treated silicone gels, the adhesiveness may be from 0.2 to 2.5 mJ, or 0.2 to 2 mJ, or no more than 2.5 mJ, no more than 2 mJ, or no more than 1.5 mJ when measured by Texture Analyzer.

Adhesive force is the force required to pull probe from sample (suction).

In some embodiments for the treated silicone gels, the negative adhesive force threshold is no more than 300 g, no more than 200 g, or no more than 170 g, or from 20 g to 300 g, or 25 g to 200 g, or 40 to 170 g when measured by Texture Analyzer.

In some embodiments for the treated silicone gels, the tack time is no more than 1.2 sec, no more than 1.0 sec, no more than 0.8 seconds, or from 0.2 to 1.2 sec, or 0.3 to 0.8 sec when measured by Texture Analyzer.

For treated silicone dry gels, the target negative force threshold is no more than 300 g, no more than 200 g, or no more than 170 g when measured by Texture Analyzer. In some embodiments, for silicone dry gels with surface treatments, the target negative force threshold is no more than about 200 g, or no more than about 150 g when measured by Texture Analyzer within about 1 week of surface treatment.

In some embodiments, for silicone dry gels with surface treatments, the target negative force threshold is no more than about 200 g when measured by Texture Analyzer after 3 weeks at ambient room temperature.

In some embodiments, the silicone gel is compressed with a certain strain or deformation (e.g., in certain embodiments, to 50% of its original size). This causes a certain stress in the material. The stress is now reduced because the material relaxes. In certain embodiments, the stress relaxation of the gel has a possible range between 20 and 60% when subjected to a tensile strain or deformation of about 50% of the gel's original size, wherein the stress relaxation is measured after a one minute hold time at 50% strain. In other embodiments, the stress relaxation of the gel is between 25% and 50% when subjected to a tensile strain of about 50%. A higher stress relaxation indicates that once a gel is installed in a closure, the gel will require less stress in order for it to seal.

Tensile properties may be tested under ASTM D412 or ISO37. The ability to resist breaking under tensile stress is an important measurable property of the silicone gels. The force per unit area (MPa) required to break a material is the ultimate tensile strength, or tensile strength at break. Tensile strength of the silicone gels of the disclosure may be in the range of from about 0.1 to about 1.5 MPa, or from about 0.2 to 1 MPa, or from about 0.3 to about 1 MPa. The ultimate elongation (UE) is the percentage increase in length that occurs before it breaks under tension. Ultimate elongation of the silicone gels of the disclosure may be in a range of from 1000% to 2300%, or from about 1100% to about 2000%, or from about 1150% to about 1900%. The combination of high ultimate tensile strength and high elongation leads to materials of high toughness. Toughness of the silicone gels of the disclosure may range from about 0.5 to about 10 mJ/m3, or about 0.7 to about 4 mJ/m3.

In some embodiments, the compression set, as measured after 50% strain is applied for 1000 hours at 70° C., may be less than 20%, or may have a range between 4% and 20%. In other embodiments, the compression set, as measured after 50% strain is applied for 1000 hours at 70° C., may have a range between 10% and 14% when measured according to the modified version of ASTM D395, method B.

EXAMPLES

Examples 1-7. Method of Making Dry Silicone Gels

Silicone dry gels were synthesized according to the following examples as disclosed in U.S. Pat. No. 9,556,336. First and second set of components were prepared as shown in Table 1.

TABLE 1

| Silicone Dry Gel Compositions | Example 1 Wt. % | Example 2 Wt. % | Example 3 Wt. % | Example 4 Wt. % | Example 5 Wt. % | Example 6 Wt. % |
|---|---|---|---|---|---|---|
| 1st set of Components | | | | | | |
| V-PDMS, Gelest DMS-35 | 99.917 | 99.917 | 99.917 | 99.917 | 99.917 | 99.917 |
| Platinum Catalyst | 0.83 | 0.83 | 0.83 | 0.83 | 0.83 | 0.83 |

TABLE 1-continued

| Silicone Dry Gel Compositions | Example 1 Wt. % | Example 2 Wt. % | Example 3 Wt. % | Example 4 Wt. % | Example 5 Wt. % | Example 6 Wt. % |
|---|---|---|---|---|---|---|
| 2nd set of Components | | | | | | |
| V-PDMS, Gelest DMS-35 | 98.719 | 97.64 | 97.593 | 97.509 | 97.439 | 97.467 |
| Crosslinker, Gelest 7278.0 | 0.329 | 0.2790 | 0.284 | 0.294 | 0.302 | 0.299 |
| Chain extender, Gelest DMS-H03 | 1.552 | 2.0450 | 2.083 | 2.157 | 2.194 | 2.219 |
| Inhibitor, Aldrich 27,839-4 | 0.04 | 0.04 | 0.04 | 0.04 | 0.04 | 0.04 |
| Hardness | 40 g | 75 g | 95 g | 145 g | 180 g | 205 g |

A first set of components was prepared. To prepare the first set of components, a platinum catalyst complex (Platinum divinyltetramethyldisiloxane complex; SIP 6830.3, Gelest Inc.) is added to a container. Vinyl-terminated polydimethylsiloxane (V-PDMS; DMS V35; Gelest, Inc.) is combined with the catalyst. The catalyst is added first to the bottom of the container. After adding the catalyst the V-PDMS can be added by pouring it into the container. Mixing is started at low rpm (100 rpm) and gradually increasing to 500 rpm in 2 minutes. After the 2 minutes mixing, the mixing speed can be increased to 1200-1400 rpm for 3 minutes.

A second set of components was prepared. A vinyl-terminated polydimethylsiloxane (V-PDMS; DMS V35; Gelest, Inc.) was added to a crosslinker, tetrakis(dimethylsiloxy)silane (GELEST SIT 7278.0), and a chain extender (hydride-terminated polydimethylsiloxane; GELEST DMS-H03). The crosslinker was added to the container first, because small variations in the added amount can greatly influence the hardness of the gel. Next, the inhibitor was added to the reaction container. The chain extender was added next. Mixing was started at low rpm (100 rpm), then after 2 minutes increased to 500 rpm, then increased mixing speed to 1200-1400 rpm for 3 minutes.

The first set of components was mixed with the second set of components at 1:1 ratio in a vial. The two sets of components were mixed at 1250 rpm for 2-3 minutes, placed under vacuum for 4-5 minutes, and poured into the desired mold. The resulting molded mixture was placed under vacuum for 3 minutes and then cured for 30 minutes at 90° C. to form dry silicone gel blocks.

Additional additives may be added to the first set of components. The additional additives may include at least one material selected from the group consisting of Dynasylan 40, PDM 1922, Songnox 1024, Kingnox 76, DHT-4A, Kingsorb, pigment, and mixtures thereof. In some embodiments, the additives comprise between 0.1 and 5 wt %, between 0.1 and 2 wt %, or between 0.1 and 1 wt % of the first set composition. Physical properties of silicone gels including hardness were tested.

Example 8: Dry Silicone Gel Composition

A dry silicone gel composition comprising certain additional additives was prepared as shown in Table 2.

TABLE 2

| Silicone dry gel composition | | | | | |
|---|---|---|---|---|---|
| Component | Description | wt | wt % A | Total wt % | Supplier |
| V-PDMS | Vinyl terminated polydimethyl siloxane | 148.71 | 96.968 | 97.2376 | DMS V-35, Gelest Inc., 5000 cSt |
| Platinum Catalyst | Platinum divinytetra-methyl-disiloxane complex | 0.15 | 0.098 | 0.0494 | SIP 6830.3, Gelest Inc. |
| PDM 1922 | Diphenyl-siloxane-dimethy-siloxane copolymer | 1.00 | 0.652 | 0.3296 | PDM 1922, Gelest Inc. |
| Anti-oxidant | Isotridecyl-3-(3,5-di-t-butyl-4-hydroxy-phenyl) Proprionate | 1.00 | 0.652 | 0.3296 | SONGNOX 1077, Songwon |
| Pigment | Gelest Black Pigment | 2.50 | 1.630 | 0.8241 | PGBLK01, Gelest Inc. |
| | TOTAL A | 153.36 | 100.000 | | |
| B side | | | | | |
| | | wt | wt % B | | |
| V-PDMS | Vinyl terminated polydimethyl siloxane | 146.27 | 97.513 | | DMS V-35, Gelest Inc., 5000 cSt |
| Cross-linker | Tetrakis (dimethyl-siloxy) silane (MH4Q) | 0.4470 | 0.298 | 0.1473 | SIT 7278.0, Gelest Inc. |
| Chain extender | hydride teminated polydimethyl siloxane | 3.2830 | 2.189 | 1.0822 | DMS-H03, Gelest Inc. |
| | TOTAL B | 150.00 | 100.000 | 100.0000 | |
| | TOTAL A + B | 303.36 | | | |

The silicone dry gel of example 7 was prepared as shown above. Final hardness of example 7 was 110 g by Texture Analyzer.

Example 9. Silicone Gels with Non-Reactive Silicone Oil-PDMS Fluid

A silicone oil gel was prepared according to the disclosure as a two part A and B composition as shown in Table 3. Non-reactive silicone oil polydimethylsiloxane (PDMS) (DMS-T23, Gelest Inc), trimethylsiloxy terminated, (350 cSt viscosity, avg MW 13650 g/mol) was added to both A and B sides. A and B sides were combined, molded and cured to form silicone oil gel blocks.

TABLE 3

| Silicone oil gel A-side, B-side and Total Compositions | | | | |
|---|---|---|---|---|
| Component | Description | wt | wt % A | Total A + B wt % |
| V-PDMS | Vinyl terminated polydimethyl siloxane | 148.71 | 59.484 | 58.9960 |
| Platinum Catalyst | Platinum divinytetramethyldi-siloxane complex | 0.15 | 0.060 | 0.0300 |
| PDM 1922 | Diphenylsiloxane-dimethylsiloxane copolymer | 1.00 | 0.400 | 0.2000 |
| Antioxidant | Isotridecy-3-(hydroxyphenyl) Proprionate | 1.00 | 0.400 | 0.2000 |
| Silicone oil | 350 CSt PDMS | 96.64 | 38.656 | 39.3280 |
| Pigment | Gelest Black Pigment | 2.50 | 1.000 | 0.5000 |
| | TOTAL A | 250.00 | 100.000 | |
| | | wt | wt % B | |
| V-PDMS | Vinyl terminated polydimethyl siloxane | 146.27 | 58.508 | |
| Crosslinker | Tetrakis (dimethylsiloxy) silane * (MH4Q) | 0.4470 | 0.179 | 0.0894 |
| Chain extender | hydride teminated polydimethyl siloxane* | 3.2830 | 1.313 | 0.6566 |
| Silicone oil | 350 CSt PDMS | 100.000 | 40.000 | |
| | TOTAL B | 250.00 | 100.000 | 100.0000 |
| | TOTAL A + B | 500.00 | | |

*Increased amounts of hydride from crosslinker and chain extender may be added to reach target hardness of about 110 g 1:1, while keeping MFHC at about 0.3-0.4.

Silicone gels were synthesized according to variations of Table 3. A first set of components was prepared. To prepare the first set of components, a platinum catalyst complex (platinum-divinyltetramethyldisiloxane complex; 3.0% Pt in vinyl terminated PDMS (SIP6830.3, Gelest, Inc.) is added first to a container. Vinyl-terminated polydimethylsiloxane (DMS-V35, Gelest, Inc.), 5,000 cSt, avg MW 49,500 g/mol, is then added and combined with the catalyst in a ratio of 100:0.101. A non-reactive silicone oil (DMS-T23, Gelest, Inc., 350 cSt) is added. Mixing is started at low rpm (100 rpm) and gradually increased to 500 rpm in 2 minutes, then mixing speed can be increased to 1200-1400 rpm for 3 minutes.

A second set of components was prepared by adding a vinyl-terminated polydimethylsiloxane (DMS-V35, Gelest, Inc.), 5,000 cSt, avg MW 49,500 g/mol, to a crosslinker, GELEST SIT 7278.0, a chain extender GELEST DMS-H03, and a non-reactive silicone oil. The crosslinker was added to the container first, because small variations in the added amount can greatly influence the hardness of the gel. The chain extender and non-reactive silicone oil was added. Mixing was started at low rpm (100 rpm). In ~2 minutes mixing was increased to 500 rpm. After this 2 minutes of mixing, the mixing speed was increased to 1200-1400 rpm for 3 minutes.

The first set of components was mixed with the second set of components at a 1:1 ratio in a vial. The two sets of components were mixed at 1250 rpm for 2-3 minutes, placed under vacuum for 4-5 minutes, and poured into the desired mold. The resulting molded mixture was placed under vacuum for 3 minutes and then cured for 30 minutes at 90° C. Additional silicone gels were made of varying hardness by adding crosslinker and chain extender while maintaining MFHC of 0.3-0.4 to obtain silicone gels having final target hardness of approximately 80 g, 100 g, 110 g, and 120 g by Texture Analyzer.

Example 10. Tackiness of Cured Dry Silicone Gel Samples without Surface Treatment Dry silicone gel blocks were prepared, molded, cured, and sent to lab for testing. No surface treatments were employed in comparative testing. Tack force measurements were obtained using a Texture Analyzer. A Brookfield RAY-K-00184 Texture Analyzer with cylindrical aluminum probe with diameter 20 mm, 700 g Aluminum probe depth, trigger load 4 g, probe speed 2.0 mm/sec, and hold time of 15 sec was employed in making the tack measurements. Qualification samples, production samples from an aluminum mold, and aged silicone gel samples were evaluated. Samples were tested as received, or after cutting 2-5 mm of surface. Results are shown in Tables 4A-4E. An aged dry silicone gel that was aged for approximately 8 months in age was evaluated in Table 4E.

TABLE 4A

Untreated dry silicone gel qualification samples

| Tackiness | tack time (s) | Neg adhesive Force (g) | adhesiveness (mJ) |
|---|---|---|---|
| sample 1 | 1.16 | 367.7 | 5.0 |
| sample 2 | 0.96 | 291.9 | 3.7 |
| sample 3 | 0.93 | 334.3 | 3.6 |
| Average | 1.02 | 331 | 4.1 |
| St dev | 0.13 | 38 | 0.8 |

TABLE 4B

Untreated dry silicone gel production samples

| Tackiness | tack time (s) | Neg adhesive Force (g) | adhesiveness (mJ) |
|---|---|---|---|
| sample 1 | 1.27 | 412.3 | 6.2 |
| sample 2 | 1.38 | 411.7 | 7.4 |
| sample 3 | 1.25 | 362.8 | 6.0 |
| Average | 1.30 | 396 | 6.5 |
| St dev | 0.07 | 28 | 0.77 |

TABLE 4C

Untreated dry silicone gel qualification samples after cutting away 2-5 mm of surface

| Tackiness | tack time (s) | Neg adhesive Force (g) | adhesiveness (mJ) |
|---|---|---|---|
| sample 1 | 1.27 | 175.2 | 2.9 |
| sample 2 | 1.13 | 237.2 | 3.4 |
| sample 3 | 1.34 | 331.8 | 5.5 |
| Average | 1.25 | 248.1 | 4.0 |
| St dev | 0.11 | 78.9 | 1.4 |

TABLE 4D

Untreated dry silicone gel production samples after cutting away 2-5 mm of surface

| Tackiness | tack time (s) | Neg adhesive Force (g) | adhesiveness (mJ) |
|---|---|---|---|
| sample 1 | 1.21 | 226.0 | 3.7 |
| sample 2 | 1.37 | 340.3 | 5.9 |
| sample 3 | 1.45 | 313.3 | 5.8 |
| Average | 1.34 | 293.2 | 5.1 |
| St dev | 0.12 | 59.74 | 1.21 |

TABLE 4E

Untreated dry silicone gel aged greater than 8 months

| Tackiness | tack time (s) | Neg Adhesive Force (g) | adhesiveness (mJ) |
|---|---|---|---|
| sample 1 | 1.58 | 762.60 | 12.79 |
| sample 2 | 1.54 | 769.20 | 13.87 |
| sample 3 | 1.89 | 772.90 | 16.47 |
| sample 4 | 1.95 | 887.00 | 21.32 |
| sample 5 | 1.55 | 784.80 | 12.75 |
| Average | 1.70 | 795 | 15.44 |
| St dev | 0.20 | 52 | 3.62 |

For untreated dry silicone gel qualification samples (Table 4A-4B) and for samples wherein 2-5 mm surface layer had been removed (Table 4C-4D) the average negative adhesive force (g) to remove probe from gel was greater than 200 g. For aged 8 month untreated silicone dry gel samples, the average negative adhesive force was very high; greater than 700 g, as shown in Table 4E. All samples exhibited tack time to Aluminum probe without surface treatment of greater than about 1 second.

For untreated dry silicone gel qualification samples without surface treatment the average adhesiveness was high; greater than about 4 mJ (Table 4A). Average adhesiveness for production samples was greater than 6 mJ (Table 4B).

For untreated silicone dry gels without surface treatment having 2-5 mm surface cut away average adhesiveness was greater than about 3.5 mJ (Tables 4C-4D). Average adhesiveness for untreated aged >8 month production samples was very high; greater than about 12 mJ.

Measurement of gel-gel adhesion for comparative untreated dry silicone gel samples without surface treatment was also measured by covering aluminum probe with untreated dry silicone gel. When measurable, the negative adhesive force for gel-gel adhesion was greater than about 200 g, tack time greater than about 2 s, and adhesiveness was greater than 5 mJ.

Example 11. Tackiness of Cured Dry Silicone Gel Samples with Surface Treatment In this example, surface treatment was applied to all surfaces of cured silicone dry gel blocks and tack force was measured to determine influence on tack time (s), adhesiveness (mJ), and average negative force (g) to remove probe from gel over time.

Specifically, dry silicone gel blocks were molded and one week later surfaces were left untreated (samples 21-25) or treated by spraying with a synthetic micronized polypropylene wax (MICROPRO 400) (samples 26-30). The samples were sent to lab for testing.

Tack force measurements were obtained using a Texture Analyzer. A Brookfield RAY-K-00184 Texture Analyzer with cylindrical aluminum probe with diameter 20 mm, 700 g Aluminum probe depth, trigger load 4 g, probe speed 2.0 mm/sec, and hold time of 15 sec was employed in making the tack measurements. The tack time (s), negative adhesive force (g), and adhesiveness (mJ) measurements were obtained for each sample. Test blocks of silicone gel were measured per time point indicated. Fresh blocks were employed for each time point, for example, at t=0, t=1 week, and t=3 weeks. Each block was tested at 3 positions over the length (left, middle, right) away from the edge of the block. A photograph was taken of each sample set.

Tack data at time=0, 1, and 3 weeks for untreated and treated dry silicone gels are shown in Tables 5 and 6.

TABLE 5

Tack Data for untreated dry silicone gel Control
Control without treatment

| Tackiness | tack time (s) | Neg Force (g) | adhesiveness (mJ) |
|---|---|---|---|
| t = 0 | | | |
| sample 21a | 1.97 | 328.2 | 8.02 |
| sample 21b | — | — | — |
| sample 21c | — | — | — |
| Average | 1.97 | 328.2 | 8.02 |
| St dev | #DIV/0! | #DIV/0! | #DIV/0! |
| t = 1 wk | | | |
| sample 22a | — | — | — |
| sample 22b | — | — | — |
| sample 22c | — | — | — |
| Average | NOT POSSIBLE TO MEASURE | | |
| St dev | SAMPLE STICKS TOO HARD ON PROBE | | |
| sample 23a | — | — | — |
| sample 23b | — | — | — |
| sample 23c | — | — | — |
| Average | NOT POSSIBLE TO MEASURE | | |
| St dev | SAMPLE STICKS TOO HARD ON PROBE | | |
| t = 3 wk | | | |
| sample 24a | — | — | — |
| sample 24b | — | — | — |
| sample 24c | — | — | — |
| Average | NOT POSSIBLE TO MEASURE | | |
| St dev | SAMPLE STICKS TOO HARD ON PROBE | | |
| Tackiness | tack time (s) | Neg Force (g) | adhesiveness (mJ) |
| sample 25a | — | — | — |
| sample 25b | — | — | — |
| sample 25c | — | — | — |
| Average | NOT POSSIBLE TO MEASURE | | |
| St dev | SAMPLE STICKS TOO HARD ON PROBE | | |

As shown in Table 5, it was not possible to measure most untreated dry silicone gel samples because the gel block sticks too hard on the probe. Measurements were obtained for a single sample at t=0 (sample 21a) where tack time was 1.97 seconds, negative adhesive force was 328 g, and adhesiveness was 8 mJ. Remaining untreated control samples 22+23 (t=1 wk) and samples 24+25 (t=3 wk) were not measurable and stuck enormously on probe, illustrating one problem to be solved.

Tackiness was significantly reduced for dry silicone gel samples having surface treated with micronized polypropylene wax (Micropro 400) over time=0, 1, and 3 weeks as shown in Table 6.

TABLE 6

Tack Data over 3 weeks for treated dry silicone gel
Dry silicone gel with micronized polypropylene
wax sprayed on the gel surface

| Tackiness | tack time (s) | Neg Force (g) | adhesiveness (mJ) |
|---|---|---|---|
| t = 0 | | | |
| sample 26a | 0.55 | 81.8 | 0.47 |
| sample 26b | 0.39 | 42.5 | 0.21 |
| sample 26c | 0.62 | 98.5 | 0.69 |
| Average | 0.52 | 74.3 | 0.46 |
| St dev | 0.12 | 28.8 | 0.24 |
| t = 1 wk | | | |
| sample 27a | 0.55 | 26.6 | 0.20 |
| sample 27b | 0.68 | 156.9 | 1.22 |
| sample 27c | 0.65 | 110.8 | 0.76 |
| Average | 0.63 | 98.1 | 0.73 |
| St dev | 0.07 | 66.1 | 0.51 |
| sample 28a | 0.58 | 78.1 | 0.44 |
| sample 28b | 0.79 | 150.0 | 1.33 |
| sample 28c | 0.56 | 119.6 | 0.84 |
| Average | 0.64 | 115.9 | 0.87 |
| St dev | 0.13 | 36.1 | 0.45 |
| t = 3wk | | | |
| sample 29a | 1.06 | 112.5 | 1.28 |
| sample 29b | 0.78 | 93.2 | 0.84 |
| sample 29c | 0.45 | 25.3 | 0.14 |
| Average | 0.76 | 77.0 | 0.75 |
| St dev | 0.31 | 45.8 | 0.57 |
| sample 30a | 0.51 | 108.6 | 0.68 |
| sample 30b | 0.64 | 73.4 | 0.45 |
| sample 30c | 0.46 | 93.4 | 0.46 |
| Average | 0.54 | 91.8 | 0.53 |
| St dev | 0.09 | 17.7 | 0.13 |
| General Average | 0.62 | 91.4 | 0.67 |
| St dev | 0.17 | 39.0 | 0.39 |

For dry silicone gel blocks sprayed with micronized polypropylene wax, over 3 weeks, tack time was reduced to no more than 0.8 seconds, Negative adhesive force was reduced to no more than 160 g, and adhesiveness was reduced to no more than 1.5 mJ, as shown in Table 6.

Example 12. Force to Open Closures Sealed with Dry Silicone Gel with and without Surface Treatment Two closures with dry silicone gel seals surface treated with a synthetic, micronized hydrocarbon wax additive (a polypropylene having a melting point from about 140° C. to about 143° C. and a mean particle size from about 4.5 μm to about 7.5 μm) were tested compared to a closure with a dry silicone gel seal that was not surface treated with such an additive. The closures were shut, aged for 7 days at 65° C. without humidity. They were then placed in a −5° C. chamber for 24 hours. The closures were removed from the chamber to ambient conditions (20° C.) and tested within one minute. The closures were then opened by pulling apart with an Instron® universal test machine. The base of the closure was held stationary and the lid was moved at a rate of 500 mm/min. A pulley was used to distribute the pulling force so there was no side load on the Instron® load cell.

Specimen 1 was the closure without the additive. Specimen 2 and specimen 3 were the closures with the additive. Specimen 1 required a maximum load of 32.70 lbf to separate the closure. Specimen 2 required a maximum load of 1.45 lbf to separate the closure. Specimen 3 required a maximum load of 4.59 lbf to separate the closure. Thus, specimen 2 and specimen 3 required very little force for separation compared to specimen 1 without the additive, which was very difficult to separate. The two closures containing the silicone gel surface treated with Micropro 400 essentially fell open after less than 5 lbs of force (lbf) (<22 N) were applied while the closure with untreated silicone gel required over 30 lbs of force (lbf) (>130 N) to open. This example illustrates that the additive significantly reduces the tackiness of the dry silicone gel.

From the foregoing detailed description, it will be evident that modifications and variations can be made to the gels and additives disclosed herein without departing from the spirit or scope of the disclosure.

What is claimed is:

1. A silicone gel seal for a closure or interconnect system, the silicone gel seal having a surface treated with an additive, wherein the additive comprises a synthetic, micronized hydrocarbon wax comprising one or more of a polyethylene, a polypropylene, and any combination thereof, wherein the additive has a melting point of at least 90° C. or from about 90° C. to about 160° C.

2. The silicone gel seal of claim 1, wherein the additive further comprises a polytetrafluoroethylene, an amide wax, an ethylene-bis (stearamide) wax, or any combination thereof.

3. The silicone gel seal of claim 1, wherein the additive has a mean particle size from about 3.0 μm to about 8.0 μm or a $D_{50}$ average particle diameter by mass of from about 5.5 μm to about 8.0 μm.

4. The silicone gel seal of claim 1, wherein the silicone gel comprises about 10 wt % or less of the additive.

5. The silicone gel seal of claim 1, wherein the additive in suspension has a viscosity from about 5 mPa·s to about 60 mPa·s at 25° C., and wherein the suspension liquid is ethanol or isopropanol.

6. The silicone gel seal of claim 1, wherein the additive has a mean particle size from about 4.5 μm to about 7.5 μm.

7. The silicone gel seal of claim 1, wherein the additive has a $D_{50}$ from about 5.5 μm to about 8.0 μm.

8. The silicone gel seal of claim 1, wherein the additive is a polyethylene.

9. The silicone gel seal of claim 1, wherein the additive is a polypropylene.

10. The silicone gel seal of claim 1, wherein the additive is a polypropylene having a melting point from about 140° C. to about 143° C. and a mean particle size from about 4.5 μm to about 7.5 μm.

11. The silicone gel seal of claim 1, wherein the additive is a combination of a polypropylene and a polytetrafluoroethylene and has a melting point from about 149° C. to about 154° C. and a mean particle size from about 5.0 μm to about 7.0 μm.

12. The silicone gel seal of claim 1, wherein the additive is a polyethylene having a melting point from about 130° C. to about 136° C., a $D_{50}$ from about 5.5 μm to about 7.0 μm, and a viscosity in suspension from about 5 mPa·s to about 15 mPa·s at 25° C., and wherein the suspension liquid is ethanol or isopropanol.

13. The silicone gel seal of claim 1, wherein the additive is a polyethylene having a melting point from about 103° C. to about 114° C., a $D_{50}$ from about 6.0 μm to about 7.0 μm, and a viscosity in suspension from about 15 mPa·s to about 50 mPa·s at 25° C., and wherein the suspension liquid is ethanol or isopropanol.

14. The silicone gel seal of claim 1, wherein the additive is a polyethylene having a melting point from about 103° C. to about 114° C., a $D_{50}$ from about 6.0 μm to about 8.0 μm, and a viscosity in suspension from about 15 mPa·s to about 60 mPa·s at 25° C., and wherein the suspension liquid is ethanol or isopropanol.

15. The silicone gel seal of claim 1, wherein the silicone gel is prepared by mixing a base polymer having a Si-vinyl group, a crosslinker, and a chain extender to provide a mixture and curing the mixture.

16. The silicone gel seal of claim 15, wherein the base polymer is a vinyl-terminated polydimethylsiloxane.

17. The silicone gel seal of claim 1, wherein the surface is treated with the additive by dusting, or by spraying, painting, or brushing the additive in a suspension liquid onto the surface.

18. The silicone gel seal of claim 17, wherein the suspension liquid is ethanol or isopropanol.

19. The silicone gel seal of claim 1, wherein the silicone gel is a dry silicone gel or a silicone oil gel.

20. The silicone gel seal of claim 1, wherein the silicone gel exhibits one or more of an adhesiveness of no more than 2.5 mJ when measured by texture analyzer;

a negative adhesive force of no more than 170 g when measured by texture analyzer; and a tack time of no more than 1.0 seconds when measured by texture analyzer.

21. A closure or interconnect system comprising the silicone gel seal of claim 1, wherein the closure or interconnect system is sealed with the silicone gel and requires no more than 10 lbf (<44 N), or no more than 5 lbf (<22 N) to open the closure or interconnect system.

22. The silicone gel seal having a surface treated with an additive of claim 1, wherein the additive consists essentially of the synthetic, micronized hydrocarbon wax comprising one or more of a polyethylene, a polypropylene, and any combination thereof, or the additive consists essentially of a micronized metallic stearate, wherein the additive has a melting point of from about 90° C. to about 160° C.

23. The silicone gel seal of claim 1, wherein the silicone gel is a silicone gel cable seal.

* * * * *